United States Patent
Rybachenko et al.

(10) Patent No.: US 10,154,142 B2
(45) Date of Patent: *Dec. 11, 2018

(54) SYSTEM AND METHOD FOR SCALABLE INTERACTION PRIORITIZATION

(71) Applicant: GENESYS TELECOMMUNICATIONS LABORATORIES, INC., Daly City, CA (US)

(72) Inventors: Michael Bell Rybachenko, Concord, CA (US); Ivan Lysiuk, Lafayette, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,878

(22) Filed: Feb. 2, 2018

(65) Prior Publication Data

US 2018/0176381 A1    Jun. 21, 2018

Related U.S. Application Data

(63) Continuation of application No. 15/431,308, filed on Feb. 13, 2017, now Pat. No. 9,888,123, which is a continuation of application No. 14/448,376, filed on Jul. 31, 2014, now Pat. No. 9,571,655.

(51) Int. Cl.
*H04M 3/00* (2006.01)
*H04M 3/523* (2006.01)

(52) U.S. Cl.
CPC ....... *H04M 3/5235* (2013.01); *H04M 3/5232* (2013.01); *H04M 3/5233* (2013.01); *H04M 2201/14* (2013.01); *H04M 2201/16* (2013.01)

(58) Field of Classification Search
CPC .. H04M 3/5175; H04M 3/523; H04M 3/5183; H04M 3/5191; H04M 3/5233; H04M 3/5232; H04M 3/5235
USPC .............. 379/265.01–265.02, 265.11–265.14
See application file for complete search history.

(56) References Cited

U.S. PATENT DOCUMENTS

2005/0175167 A1    8/2005  Yacoub et al.
2016/0036978 A1    2/2016  Rybachenko et al.

*Primary Examiner* — Rasha Al Aubaidi (57) ABSTRACT

A system and method include a processor and a memory. The memory stores instructions, which when executed by the processor, causes the processor to allocate interactions to a server based on a function of a criteria over time, where the server can only handle a determined number of interactions at a time.

20 Claims, 9 Drawing Sheets

SYSTEM AND METHOD FOR SCALABLE INTERACTION PRIORITIZATION

CROSS-REFERENCE TO RELATED APPLICATIONS

This is a continuation application of U.S. patent application Ser. No. 15/431,308, filed on Feb. 13, 2017, now U.S. Pat. No. 9,888,123, which is a continuation of U.S. patent application Ser. No. 14/448,376, filed on Jul. 31, 2014, now U.S. Pat. No. 9,571,655, the content of all of which are incorporated herein by reference.

BACKGROUND

Customer-centric organizations can attempt to seamlessly integrate contact center operations with customer intelligence to ensure a complete and actionable view of the customer. Interactions can be treated as an opportunity to improve the customer experience through superior service, resulting in customer satisfaction, loyalty, and retention. These can lead to increased sales, profits, and success. Enterprise service and marketing applications can allow enterprises to leverage the synergy of the management of customer data and interactions.

BRIEF DESCRIPTION OF THE DRAWINGS

In association with the following detailed description, reference is made to the accompanying drawings, where like numerals in different figures can refer to the same element.

DETAILED DESCRIPTION

Systems and methods can provide for providing scalable interaction processing, with interactions priorities changing over time, capable of delivering a highest priority interaction at any moment of processing. Service type interactions, email tasks, letter tasks, internally generated tasks, subsequent tasks for following up on interactions, can exist for a period of time, e.g., days, weeks or months. Each task is tracked so that they are not dropped and the interactions are handled within determined time frames, e.g., so that they are not handled too prematurely or too late.

Figure 1:
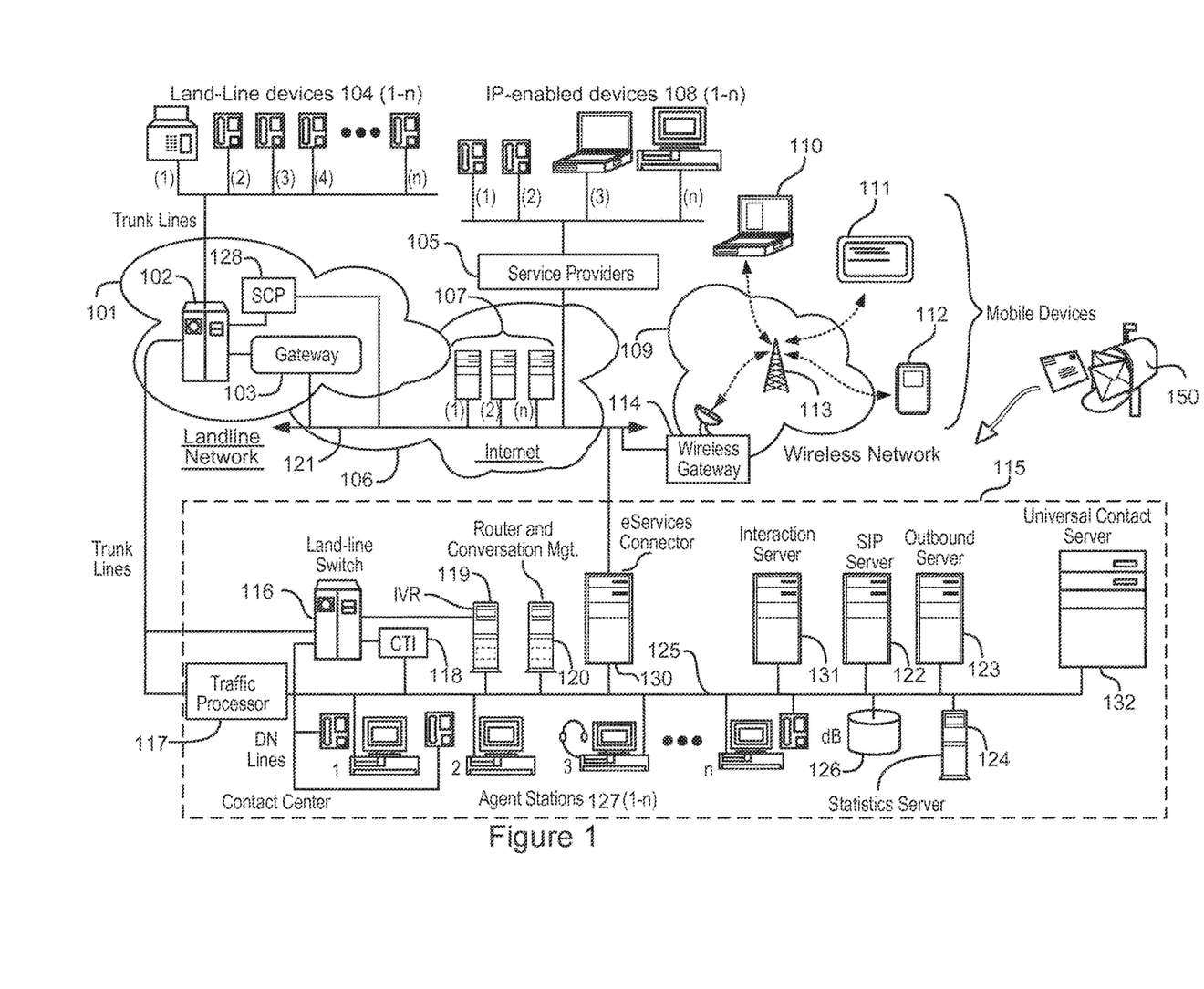
FIG. 1 is a block diagram of an exemplary architectural overview of a contact center.

FIG. 1 is a block diagram illustrating a contact center 115 and a plurality of networks with interconnections whereby customers and remote agents may interact with the contact center. Contact center 115 may be hosted by an enterprise and the enterprise may employ more than one contact center. Customers and agents may interact with contact center 115 through communication appliances such as land-line devices, e.g., telephones and facsimile machines 104 (1-n), IP-enabled devices 108 (1-n), through mobile appliances 110, 111 or 112, through the postal mail 150, etc. Interactions may include voice, text interaction, email, messaging services chat, facsimiles, mailed letters, and so on. The interaction server 131 servers interactions to agents based on priority, e.g., highest priority interactions are served first. As described herein, priority can be based on an age of the interaction.

Interactions can include near real-time interactions and deferrable interactions. Interactions include one- or two-way actions between a company and its customers. Two-way interactions can include answering a received email, while on-way interactions can include internally created outbound tasks, e.g., reaching out to customers for offering new services. If the customer responds the interaction can become a two-way interaction. Therefore, tasks can be either responses to customer initiated interactions and/or internally created tasks. In both cases a task is waiting for processing by an agent.

Persons interacting through land-line devices 104 may connect firstly over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch.

Persons interacting through IP-enabled devices 108 (1-n) may interact through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108(n)

illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement by which users and agents may interact with contact centers is through mobile devices, illustrated in FIG. 1 by devices 110, 111 and 112. Such devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implements with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMINATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more.

The Interaction Server 131 may leverage services of other servers in the contact center, and available remotely as well. For example, SMS and email can be processed by a universal contact server 132 which interfaces with a database to store data on contacts, e.g., customers, including customer profiles and interaction history. The customer profile can include information about a level of service that the customer's interactions are to receive, e.g., for distinguishing a customer segment (gold/silver/bronze) a particular interaction belongs to.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other known communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB 126 may be provided to archive interaction data and to provide storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary.

Contact centers may operate with a wide variety of media channels for interaction between agents and customers who call in to the centers. Such channels may enable voice interaction in some instances, and in other instances text-based interaction, which may include chat sessions, email exchanges, and text messaging. Mail and email are examples of interactions for an agent to engage in some particular future or scheduled time. Tracking and prioritizing such interactions can be a challenge.

Figure 2:
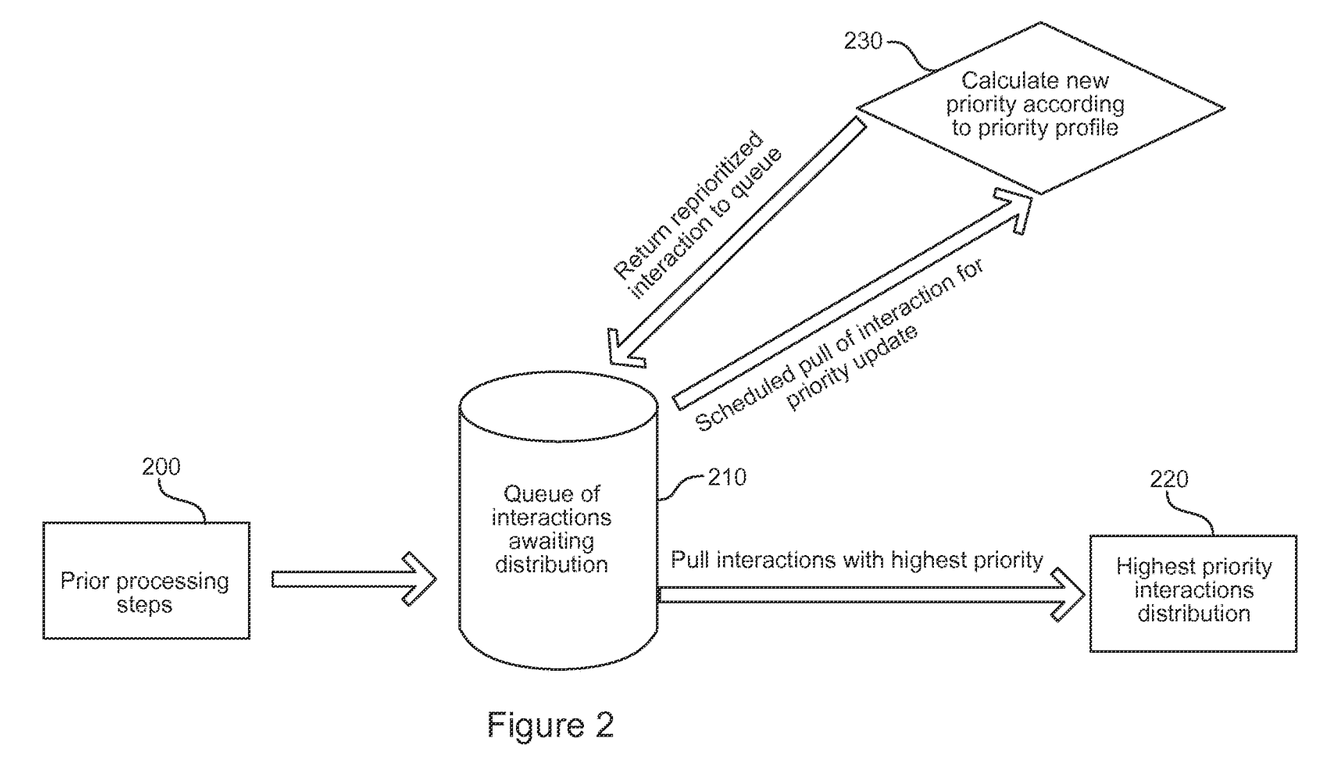
FIG. 2 is a block diagram of an exemplary logic for reprioritizing interactions in a non-scalable way.

FIG. 2 is a block diagram of an exemplary workflow for prioritizing interactions that may not be conveniently scalable. Interactions received at the contact center can be processed, e.g., segmented by customer segment, service type, etc. (200). Depending on the type of customer segment and/or the service type different service levels may apply. Interactions that are waiting to be sent to an agent can be stored (210). Highest priority interactions are pulled for distribution to the agents (220). Pulling the interactions can take into account an availability of agents and the agents' skill levels and/or other considerations, e.g., 10% of agents can handle mortgages, 15% of agent can handle credit cards, 5% can handle insurance claims, etc. While waiting to be sent to an agent, new priority levels can be periodically calculated for the interactions based on priority profiles (230). The reprioritized interactions are stored.

Figure 3:
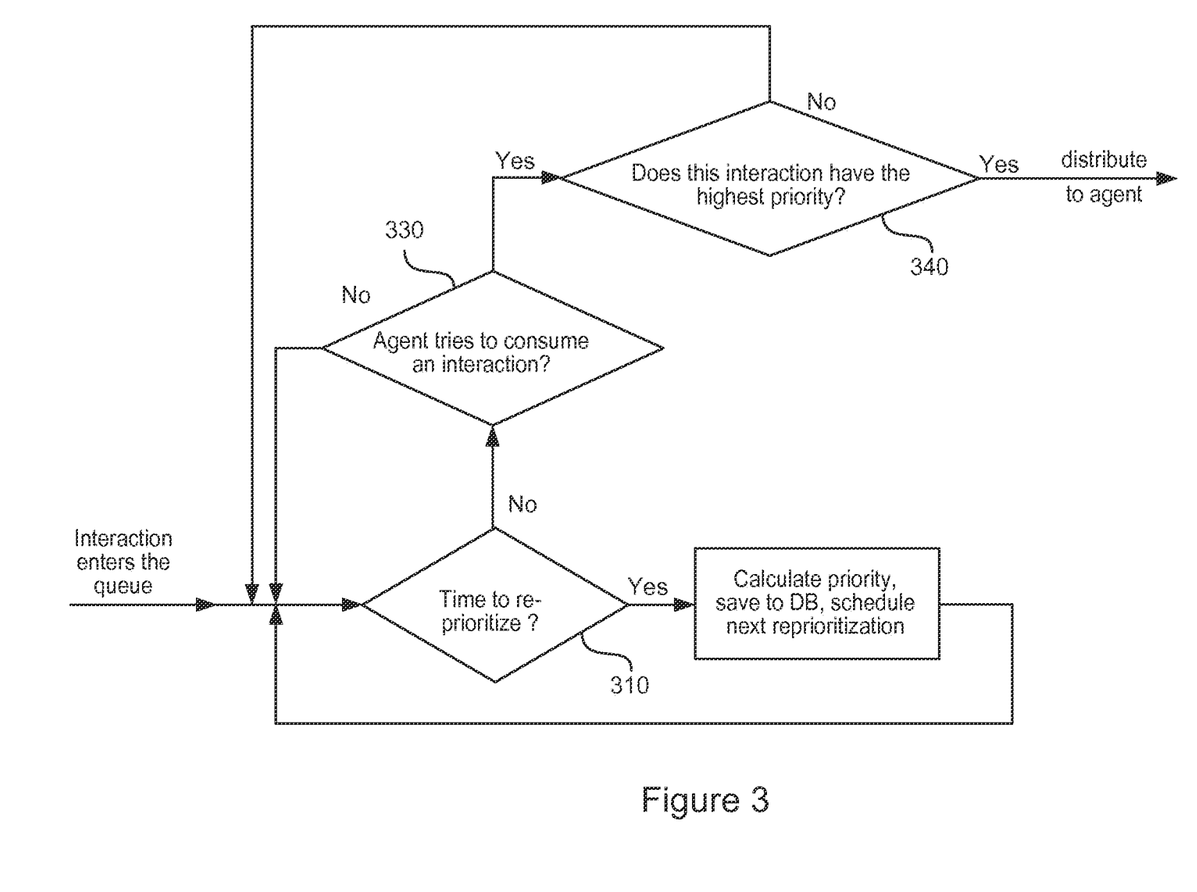
FIG. 3 is a flowchart of prioritization according to FIG. 2 for providing an agent with a highest priority interaction.

FIG. 3 is a flowchart of prioritization according to FIG. 2 for providing an agent with a highest priority interaction. This priority solution can involve scheduling periodic reprioritization of each interaction, according to the priority profile of an interaction, where priority profile is a function of interaction age. An interaction enters a queue of interactions waiting to be handled by an agent. The interaction is assigned a determined priority profile depending on, for example, a customer segment. The interactions are re-prioritized at determined times. If it is time to re-prioritize (310), a new priority is calculated for each interaction and saved to the database 126 (320). When an agent has the capacity to consume an interaction (330), the highest priority interaction is distributed to the agent (340). Otherwise, the interactions remain in the queue (300).

A problem can exist in that a number of interactions can be very large, (e.g., more than all available agents are capable of processing within a day), while all of the long-living interactions require priority reevaluation. A frequency of reprioritizations grows with the number of interactions. This setup may not be scalable since there is a limit on processing power. The limited scalability is due to each explicit reprioritization consuming system resources, while the rate of reprioritizations in the system grows linearly with the total number of interactions in the system. If, for example, each interaction updates a priority every hour, or every 3600 seconds, then the rate of its updates is $r=1/3600$. In one example, if the system has in equilibrium $N=36'000'000$ interactions, the total rate of interaction priority updates in the system is $R=N*r=10'000$ per second. The interaction processing system can have an upper limit on the number of interaction updates it can perform per unit of time and these interaction updates involve priority updates as well as other business process flow updates to the interactions. With the rate of priority updates being proportional to the number of interactions in the system while the number of interactions is growing in the system, the system resources can be exhausted by the need to update current priority of each interaction.

Figure 4:
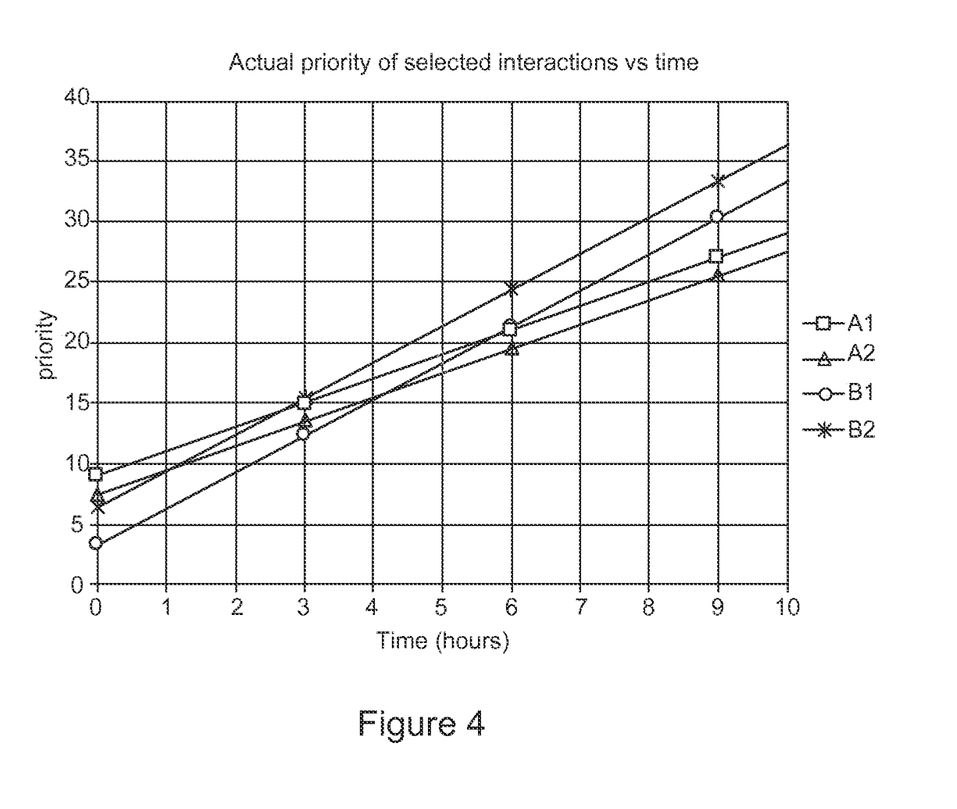
FIG. 4 is a chart illustrating actual priority of interactions (A1, A2, B1, B2) for two profiles (Profile A) and (Profile B) over time.

FIG. 4 is a chart illustrating actual priority of interactions (A1, A2, B1, B2) for two profiles (Profile A) and (Profile B) over time. The priority profiles can be expressed as a function of interaction age: e.g., Priority_A(age in hours)= 2*age, and Priority_B(age in hours)=3*age.

The 4 interactions have the following ages at time 0:

|  | interaction | | | |
| --- | --- | --- | --- | --- |
|  | A1 | A2 | B1 | B2 |
| age at time 0 | 4.5 | 3.75 | 1.1 | 2.12 |

If the interactions do not leave the system for at least 10 hours, their corresponding priorities change with time, as their age increases (see FIG. 4). At time t=0, the following is the list of interactions ranked from the highest priority to the lowest: A1, A2, B2, B1. At time t=3 the ranking is: B2, A1, A2, B1. At time t=6 the ranking is: B2, B1, A1, A2. The example demonstrates that the actual priorities of interactions change over time and therefore affect which interaction has the highest priority at any given moment.

Figure 5:
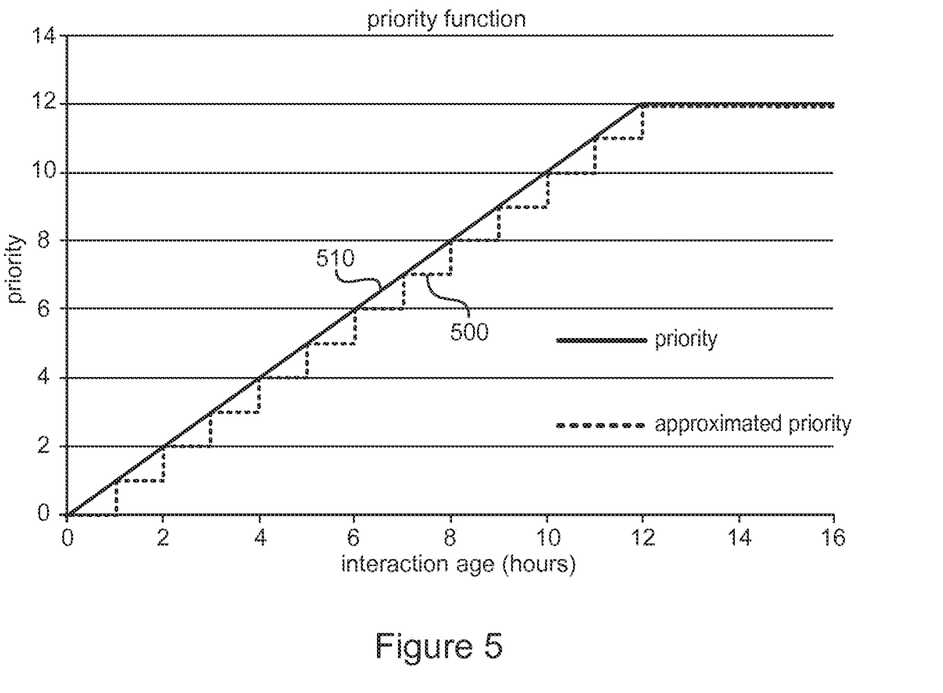
FIG. 5 is a chart illustrating approximated priority plotted against actual priority in a non-scalable way.

FIG. 5 is a chart illustrating approximated priority 500 plotted against actual priority 510 in a non-scalable way. Depending on how often priority is recalculated, the system may potentially select an interaction not having the highest actual priority. This is a potential drawback of previous approaches which are based on periodic reprioritization. If re-prioritization is scheduled to happen more frequently, the approximation can be improved, but can never be perfect and also compromise the scalability of the system. As discussed above, the overall system rate of reprioritizations is proportional to the number of interactions in the system. Therefore, an attempt to improve priority approximation for all the interactions in the system may lead to a state when all the system resources are consumed for re-prioritization only. Even while no agents are available and interactions are not consumed by them, the system can spend un-scalable amounts of processing power for periodic reprioritization. FIGS. 6-9 present an interaction prioritization solution that is scalable.

Figure 6:
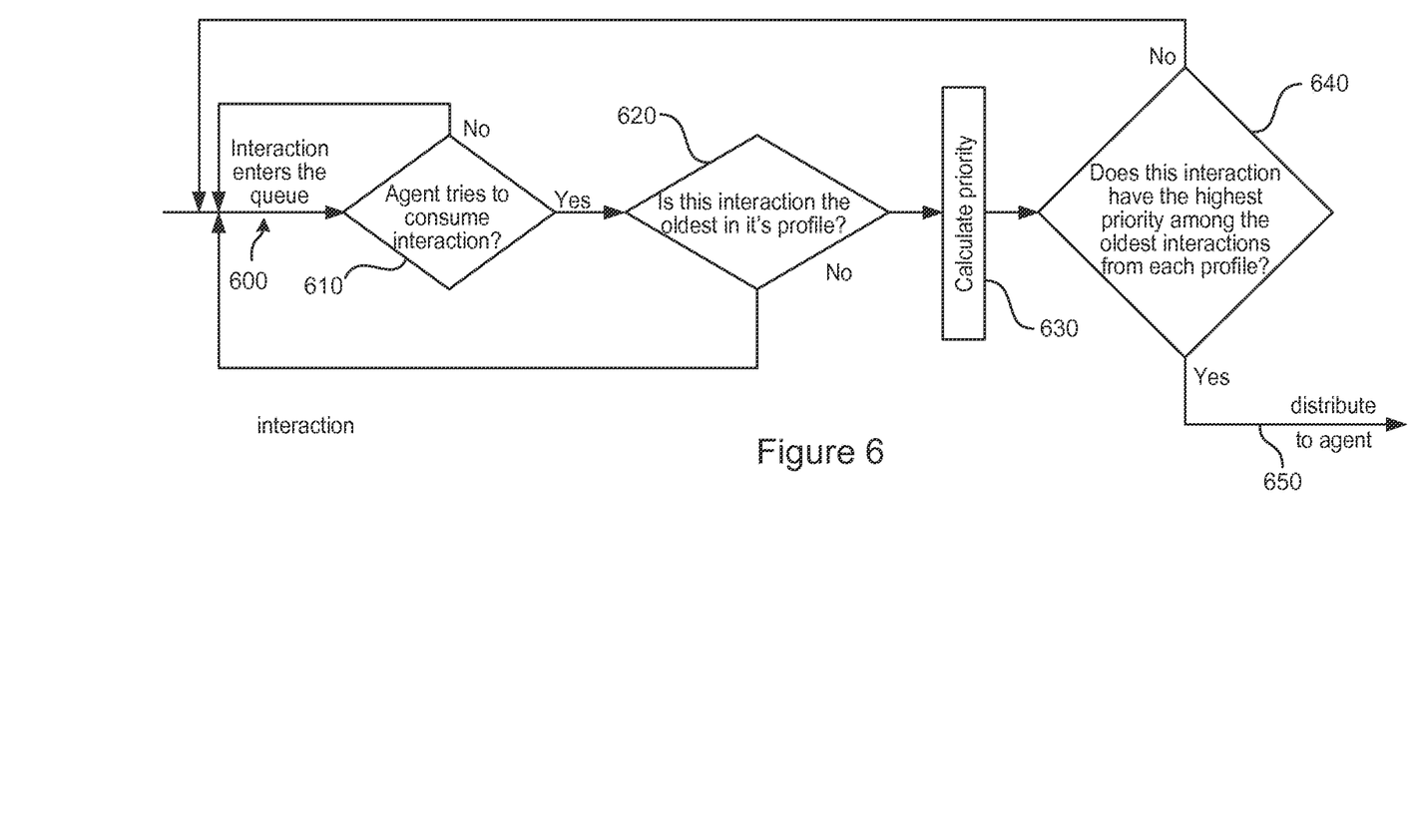
FIG. 6 is a flowchart illustrating an exemplary logic for scalable re-prioritization of interactions that have non-decreasing priority profiles.

FIG. 6 is a flowchart illustrating an exemplary logic for scalable re-prioritization of interactions that have non-decreasing priority profiles. Interactions enter the queue (600) and remain there until and agent can handle them (610).

When an agent is available to consume an interaction (610), the interaction server 131 determines if the interaction is the oldest, or one of a determined X number of oldest, in the profile, for each profile (620). The priority is calculated or re-calculated for only the oldest interactions per profile (630). If the interaction has the highest priority, or determined X number of highest priorities if multiple interactions are sent, among the oldest interactions from the profiles (640), the interactions are distributed to the available agent(s) (650). As described in more detail below, the priority profile can be separated into a number of non-decreasing and decreasing profile segments. The above approach, formulated for the case of a priority profile having a single non-decreasing profile segment, can be generalized to the cases when the priority profiles include a number of non-decreasing and decreasing priority profile segments. Potential candidate interactions for distribution include the oldest interactions belonging to the non-decreasing profile segments, and the youngest interactions of the decreasing profile segments.

Figure 7:
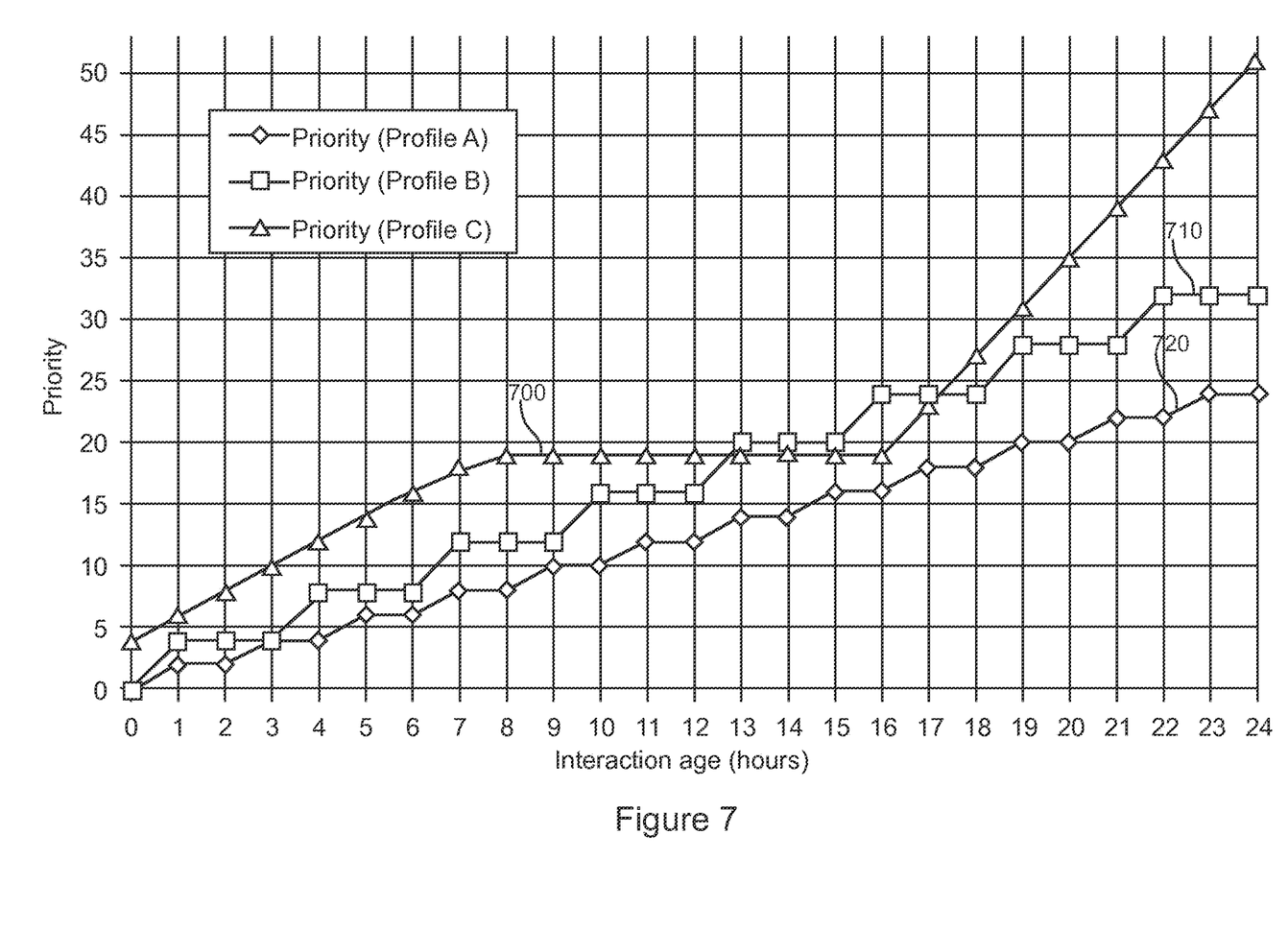
FIG. 7 is a chart illustrating an exemplary non-decreasing priority profiles for interactions in profiles A, B and C over time.

FIG. 7 is a chart illustrating an exemplary non-decreasing priority profiles for interactions in profiles A (700), B (710) and C (720) over time. For explanation purposes, there are three distinct priority profiles in the system, but other amounts of profiles can be used. There can be many different types of profiles, for example, profiles by media type, e.g., chat, email, facsimile, scanned letter, etc., profiles by service level, e.g., gold, silver, bronze, etc., profiles by customer segment, by service type, e.g., checking and saving accounts, service type, e.g., mortgage, credit card, change in address, etc., by keyword, e.g., a threatened lawsuit, etc. Through a seamless integration, enterprises can offer their customers' choice of access options such as e-mail, fax, Web chat, work item, and traditional voice. Customer interactions can be prioritized, matched, and assigned to the best available agents, e.g., to be handled, based on the customer need, history, class of service, and business rules.

For example, gold level customer segment interactions are handled within a faster time frame than silver level, and bronze level interactions can take longer to handle than silver level, etc. The time frames for handling interactions can be described, for example, by explicit or implicit service level agreements which determine a maximum period of time for returning an answer to the customer. There can also be service level agreements for internally generated tasks, e.g., unsolicited contacts to the customer. For example, the service level agreement may indicate that gold interactions are to be serviced within one day. The service time frames can vary from customer to customer and can vary by service type, e.g., credit card, customer segment, e.g., gold level, and media type, e.g., email, chat, scanned letter, etc. There may be further influential factors, e.g., regulatory (tax day April 15), business specific (e.g. due time for submitting bids), or promises, etc.

Chats can be serviced in a faster time frame than email, and interactions via Facebook can be serviced faster than email but slower than chat, for example. The profiles can be for outbound as well as inbound interactions, e.g., an insurance company sending an insurance quote when a child becomes a driving age can have a higher priority than sending a general questionnaire. The types of profiles can be implementation dependent. The profiles can be presented as functions F_A(age), F_B(age) and F_C(age), e.g., the age of the interaction. The priority profiles are non-decreasing functions of interaction age. At each interaction pull, the following structured query language (SQL) queries can select up to three interactions from each profile to identify the one with the actual highest priority:

above logic might be already incorporated in SQL query
select top 1*from interactions_table where profile='ProfileA' order by received_at ASC;
select top 1*from interactions_table where profile='ProfileB' order by received_at ASC; and
select top 1*from interactions_table where profile='ProfileC' order by received_at ASC.

The interaction pulls are scalable such that other numbers of queries can be performed, e.g., based on a number of interaction profile segments. For example, for Gold, Silver and Bronze interaction profile segments, e.g., ProfileA, ProfileB and ProfileC, three prioritization queries are performed. Profile segments can be changed dynamically on the fly. For 'select top 1', one or more of the top interactions, e.g. oldest interactions, can be selected from each priority profile segment, for example, based on a number of interactions that the pool of agents can handle each time the interactions are pulled or the number of interactions pulled for intermediate phases before being sent to an agent, e.g., for the purpose of re-prioritization. The 'id' is the interaction identification, ordered in ascending (ASC) order. The SQL language is used for explanation purposes, and ways other than SQL can be used to communicate with the database. For example, the systems and methods can also work with voice calls maintained in a memory of the router 120 and/or to help an agent reservation module prioritize interactions being routed to agents from multiple routers 120.

As a result of the query, there would be up to three interactions, the oldest for their priority profile. The respective priority profile functions are applied to their ages to find which interaction has the highest priority. The number of priority profiles applicable to interactions is fixed or does not grow as fast as the number of interactions, and each interaction carries a record of which priority profile is applicable to it. In this case, the system can treat interactions with different priority profiles as separate FIFO (oldest first), and pull the oldest interactions to calculate the priorities of the pulled interactions and select the highest priority interactions for further distribution. For example, if there are 10 priority profiles in the system and a single oldest interaction is pulled from each profile, the system need only calculate current priorities for ten interactions, and select an interaction with the highest priority for further distribution. Each pull utilizes a rather limited processing resources, which does not depend on the total number of interactions in the system.

Therefore, priority profile functions can be any piecewise functions in which priority can change between reprioritizations. The systems and methods are scalable such that priority calculations can be accomplished only for a small set of interactions, independently of the number of interactions in the system. Therefore, the number of interactions can grow without affecting the processing resources of the system. There is no performance impact of based on a number of reprioritizations. There can be a guaranteed correct priority since the priority of pulled interactions is up to date as the priority is calculated at the moment of pull. When trying to route highest priority interactions to agents, if some of the interaction cannot be routed because there are no available agents, e.g., with required skills, then the interactions are re-inserted into the queue with appropriate priority and queued for a next chance to route them.

Figure 8:
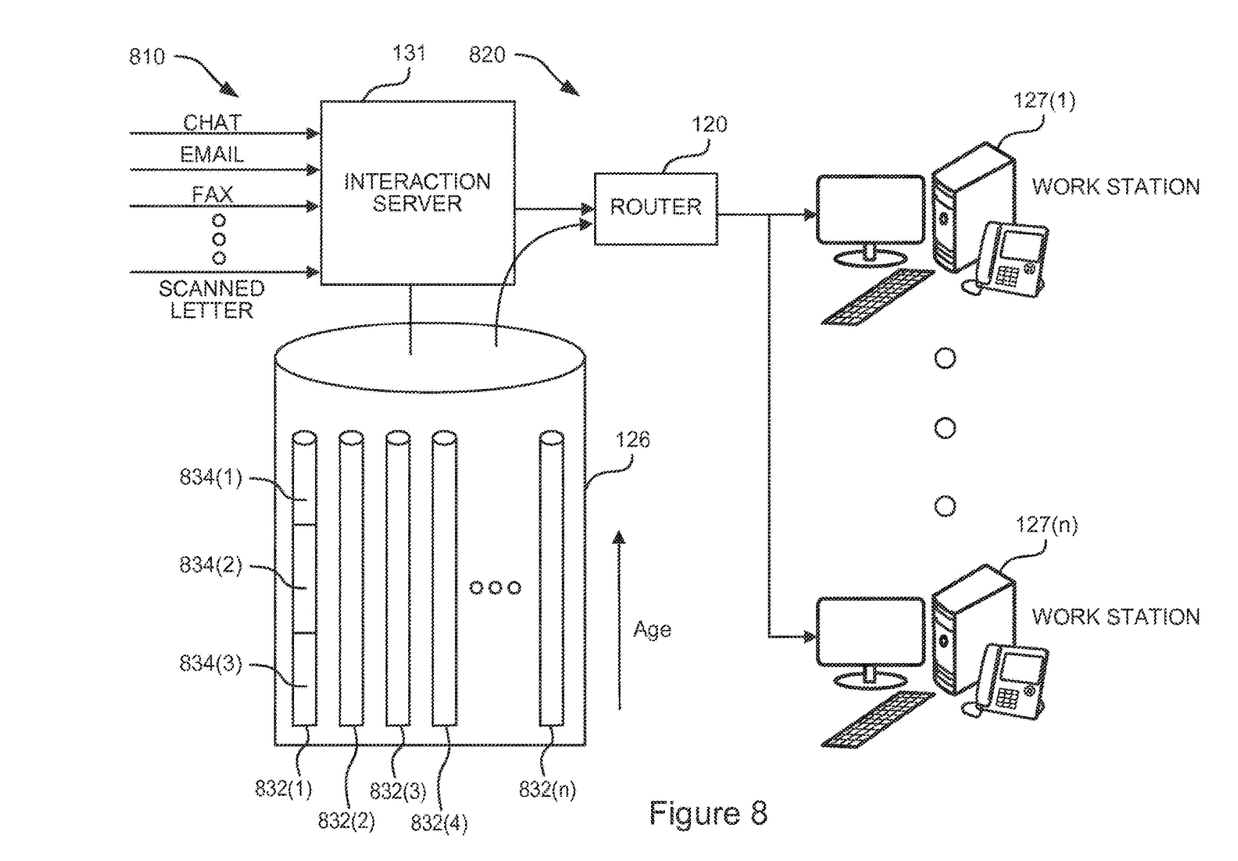
FIG. 8 is a block diagram of an exemplary system for prioritizing interactions and serving prioritized interactions to workstations.

FIG. 8 is a block diagram of an exemplary system 800 for prioritizing interactions and serving the prioritized interactions to agent stations 127 (1-n). Interactions are inputted over channels 810 to interaction server 131 for processing, e.g., converting the interactions to tasks. The interaction server 131 can serve interactions to the agents. Priority affects the order in which interactions are served to the next available agent. Generally a higher priority means the interaction is served to an agent sooner. The interactions can include chats, email, scanned letters, etc. The agent stations 127 (1-n) provide workstations for contact center agents to handle the interactions. Additionally or alternatively, the interactions can be handled with an automated response. The interaction server 131 can store the interactions in one or more databases, including a distributed database, e.g., Cassandra while they are waiting to be handled. When the interaction server 131 picks an interaction to be handled, the task can be sent to a router 120 for determining an agent to handle the task and sending the task to agent stations 127 (1-n) for that agent. The tasks can be sent to the agents for handling in an order that is based on priority. The router 120 can include the URS or other type of router.

The interactions that qualify for the various profiles can be stored. For example, interactions that qualify for profile 1 can be stored in segment 832(1), interactions that qualify for profile 2 can be stored in segment 832(2), interactions that qualify for profile 3 can be stored in segment 832(3), interactions that qualify for profile n can be stored in segment 832(n), etc. The interactions can be sorted within the segments 832(1)-(n) to be ordered from oldest received interaction to newest received interaction. Other implementations are possible, such as ordering from newest to oldest, etc. The separation by segments can be purely logical and/or physical.

The interaction server 131, or other device, can include a processor and a memory, where the memory stores instructions, which when executed by the processor, causes the processor to allocate interactions to the router 120, or other server, based on function of a criteria over time, e.g., a priority of the interactions over time. The router 120 can handle a determined number of interactions at a time, to send the interactions to the workstations 110(1)-(n) to be handled automatically and/or by contact center agents. The criteria includes a priority and the priority can be based on a service level agreement. The interactions can be divided into segments 832(a)-(n).

A top interaction, or determined number of top interactions, from each of the segments can be calculated to determine an interaction to allocate to the router 120. The other interactions, e.g., non-top interactions, from the segments are not reprioritized upon allocation. This can save on reprioritizing processing power. Reprioritization of the top interactions from each priority profile segment can occur at a time of allocation of the interactions to the router 120. The allocations can occur when the router 120 is able to handle the interactions, e.g., for processing and sending to contact center agents. The profile segments can be changed dynamically. The segments can also be divided into sub-segments 834(1), 834(2), 834(n), for example, if there are non-decreasing and decreasing parts of the profile, e.g., as described in FIG. 9.

Figure 9:
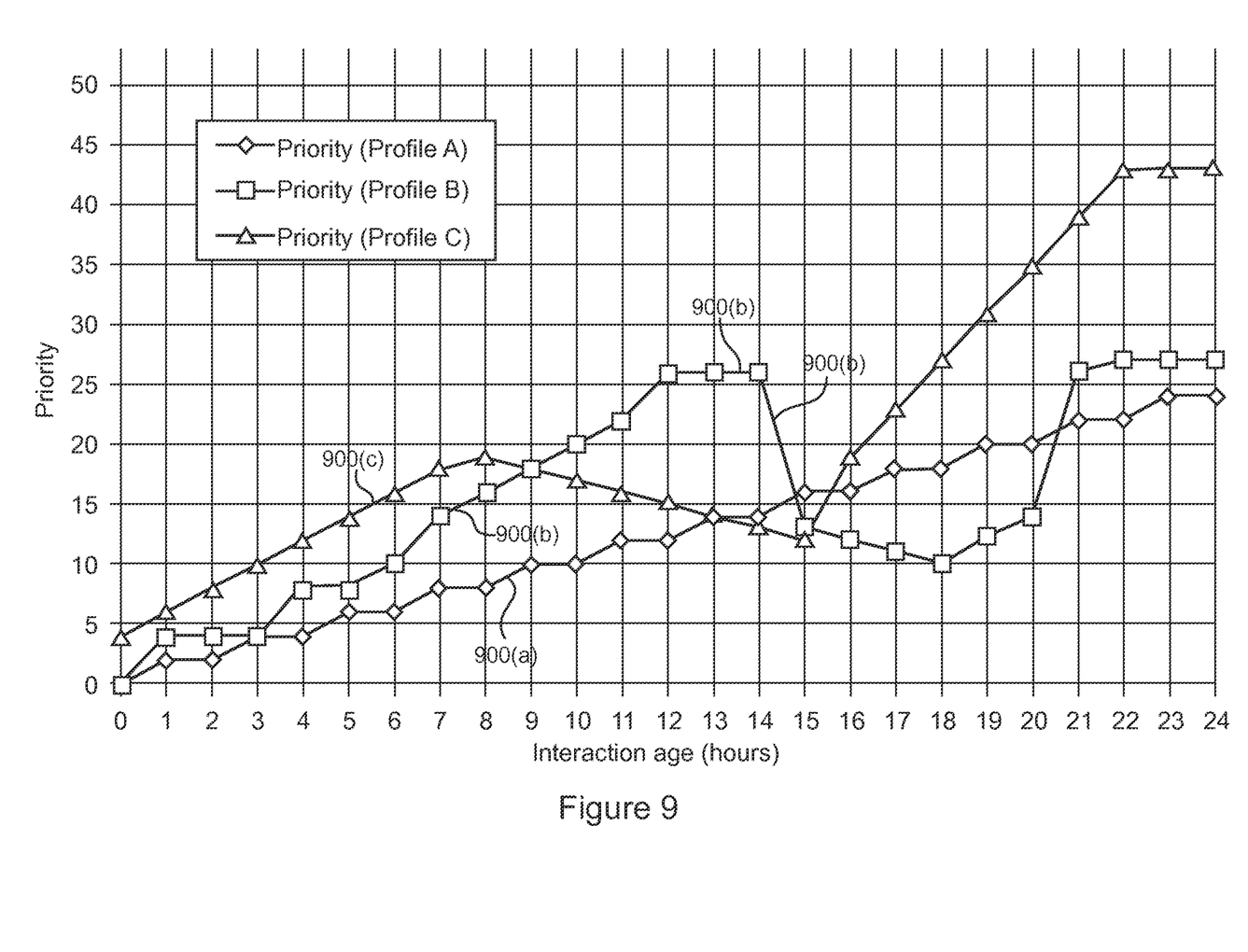
FIG. 9 is a chart illustrating an exemplary priority profiles of non-decreasing and decreasing segments for profiles A, B and C over time.

FIG. 9 is a chart illustrating an exemplary priority profiles of non-decreasing and decreasing segments for profiles A, B and C over time. The systems and methods can also be implemented for systems with priority profiles determined as piecewise functions of interaction age, e.g., when such functions can be split into a limited number of non-decreasing and decreasing segments. In a basic scenario, the interactions are segmented according to their corresponding non-decreasing priority profiles. In a more general case, the system includes at least one priority profile which contains non-decreasing parts and decreasing parts. In this case, the interactions having the profile are split into more detailed segments corresponding to each non-decreasing part 900(a), 900(b), 900(c) and decreasing part 910(b), 910(c) of the priority profile. If there are ten profiles, for example, each including initial non-decreasing parts, then decreasing parts and then again a non-decreasing parts of the profile, each profile generates three segments per profile, resulting in thirty segments total. The segments are determined not only by the interaction profile, but by interaction age as well. In this case, the system can pull, for example, a single interaction from each priority profile segment, evaluate the priority of these up to thirty interactions and select the interactions with the highest priority for further processing. The decreasing parts of the segments can be due to different factors, e.g., a first deadline was missed, a time zone of the customer, etc. Thirty interaction profiles is used for explanation purposes and more or less interaction profiles can be used.

For three distinct priority profiles in the system, e.g., 900(a), 900(b), 900(c), the profiles can be presented as functions F_A(age), F_B(age) and F_C(age). Other amounts of profiles can be used. The service level agreement rules can create non-linear lifecycles for the interactions. For example, the priority profile A is a non-decreasing function, the priority profile B is a non-decreasing function for ages from 0 to t1B=14, a decreasing function for ages from t1B=14 to t2B=18, and again a non-decreasing function on the interval from t2B=18 up to any age, and the priority profile C includes a non-decreasing part, decreasing part and again a non-decreasing part, which can be separated by ages t1C=8 and t2C=15. Priority can decrease, for example, if a deadline for the interaction has passed. In this example, the profile A includes a segment referred to as S_A1. The profile B has three segments: S_B1, S_B2, S_B3. And the profile C has three segments: S_C1, S_C2 and S_C3. The total number of segments for the three profiles A, B and C is 7.

In this scenario, one oldest interaction is pulled, e.g., to be sent to an agent, per non-decreasing segment and one youngest interaction per each decreasing statement.

select top 1*from interactions_table where profile='ProfileA' order by received_at ASC;
select top 1*from interactions_table where profile='ProfileB' and datediff(received_at,CURRENT_TIMESTAMP)<=t1B order by received_at ASC;
select top 1*from interactions_table where profile='ProfileB' and datediff(received_at,CURRENT_TIMESTAMP)>t1B and datediff(received_at,CURRENT_TIMESTAMP)<=t2B order by received_at DESC;
select top 1*from interactions_table where profile='ProfileB' and datediff(received_at,CURRENT_TIMESTAMP)>t2B order by received_at ASC;
select top 1*from interactions_table where profile='ProfileC' and datediff(received_at,CURRENT_TIMESTAMP)<=t1c order by received_at ASC;
select top 1*from interactions_table where profile='ProfileC' and datediff(received_at,CURRENT_TIMESTAMP)>t1c and datediff(received_at,CURRENT_TIMESTAMP)<=t2c order by received_at DESC; and
select top 1*from interactions_table where profile='ProfileC' and datediff(received_at,CURRENT_TIMESTAMP)>t2c order by received_at ASC.

These statements select up to seven interactions with highest priority in their respective segments. The actual priorities of the selected interactions are calculated, depending on profile and age, and the interaction with the highest priority is made available for further processing.

In another implementation, the above two embodiments are directly expendable to the case when some number N of highest priority interactions are to be pulled from the segments. In each statement, 'select top 1' is replaced with 'select top N'. In one example, assuming that 5 oldest interactions from profile 1 have priorities exceeding the priorities of 5 oldest from any other profile, upon selection from the database 126, the actual priorities of all selected interactions can be calculated not by a database query but in memory, and the selected interactions are internally sorted in descending order of their actual calculated priorities. Assuming the router 120 is ready to consume 5 interactions with the highest priority, then the top 5 from this short sorted list are provided to the router 120. The actual priorities of the selected interactions can be calculated in memory before choosing top N interactions from memory to be consumed by the router 120.

In another implementation, instead of assuming that an interaction, or interactions, with the highest priority are distributed from the interactions awaiting distribution as soon as there are available agents to process it, it may be the case that the agent, or agents, available to process the interaction cannot serve just any interaction from the stored interactions awaiting distribution due to the available agents having skills to process only a subset of interactions. For example, assuming that the interactions have a property language, which represents the language of the interaction, if the available agents can only process interactions in "Spanish" at that moment, and the interactions are stored in multiple languages, the interaction server selects an interaction with the highest priority, among the interactions with the language property equal to "Spanish". Therefore, the select statements described above for each priority profile segment can be modified by extending the where clause with (AND language='Spanish'). When applied to FIG. 4 above, the corresponding select statements is modified as follows:

select top 1*from interactions_table where profile='ProfileA' AND language='Spanish' order by received_at ASC;

select top 1*from interactions_table where profile='ProfileB' AND language='Spanish' order by received_at ASC; and select top 1*from interactions_table where profile='ProfileC' AND language='Spanish' order by received_at ASC.

More generally, the where clause of prior implementations can be denoted as PROFILE_AND_SEGMENT_CONTITIONs. Skills of currently available agents at the moment of distribution can be denoted as CURRENT_DISTRIBUTION_CONDITION. In prior implementations, selection of top one interaction from the i-th profile/segment was done with the following generalized statement:

select top 1*from interactions_table where PROFILE_AND_SEGMENT_CONTITION_i order by received_at ASC.

Given that the current distribution conditions are available and non-trivial, the selection of top one interaction from the i-th profile/segment is done with the following generalized statement:

select top 1*from interactions_table where PROFILE_AND_SEGMENT_CONTITION_i and CURRENT_DISTRIBUTION_CONDITION order by received_at ASC.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A system comprising:
a processor; and
a memory, where the memory stores instructions which, when executed by the processor, cause the processor to:
identify a first plurality of interactions and a second plurality of interactions for a contact center;
associate the first plurality of interactions with a first profile;
associate the second plurality of interactions with a second profile different from the first profile;
monitor for a condition for conducting priority determinations;

generate a set of candidate interactions in response to detecting the condition, wherein the set of candidate interactions include a first subset of interactions of the first plurality of interactions, and a second subset of interactions of the second plurality of interactions;

conduct priority determinations of the interactions in the set of candidate interactions without conducting priority determinations of remaining interactions of the first and second plurality of interactions not included in the set of candidate interactions, wherein the instructions to conduct the priority determinations include instructions that cause the processor to calculate a priority value for each of the interactions in the set of candidate interactions;

select an interaction from the set of candidate interactions based on the determined priority values; and a router coupled to the processor, the router being configured to route the selected interaction to an electronic device of the contact center.

2. The system of claim 1, wherein the first and second plurality of interactions are voice interactions, emails, chat messages, or instant messages.

3. The system of claim 1, wherein the first profile is associated with at least one of a first customer segment, a first media type, a first service level, or a first service type, and the second profile is associated with a second customer segment, a second media type, a second service level, or a second service type.

4. The system of claim 1, wherein the condition for conducting priority determinations is detecting a time for conducting the priority determinations.

5. The system of claim 4, wherein the time is based on a rate of conducting the priority determinations, wherein the rate is proportional to a total number of interactions at the contact center.

6. The system of claim 1, wherein the first subset of interactions is a particular number of oldest interactions of the first plurality of interactions, and the second subset of interactions is a particular number of oldest interactions of the second plurality of interactions.

7. The system of claim 6, wherein the particular number of interactions is based on a number of interactions that a pool of agents is predicted to be capable of handling at a time of generating the set of candidate interactions.

8. The system of claim 1, wherein the first subset of interactions is a particular number of oldest interactions of the first plurality of interactions, and the second subset of interactions is a particular number of youngest interactions of the second plurality of interactions.

9. The system of claim 1, wherein the instructions that cause the processor to calculate the priority value for each of the interactions include instructions that cause the server to calculate the priority value as a function of age and profile associated with each of the interactions, the profile being one of the first and second profiles.

10. A method comprising:

identifying, by a processor, a first plurality of interactions and a second plurality of interactions for a contact center;

associating, by the processor, the first plurality of interactions with a first profile;

associating, by the processor, the second plurality of interactions with a second profile different from the first profile;

monitoring, by the processor, for a condition for conducting priority determinations;

generating, by the processor, a set of candidate interactions in response to detecting the condition, wherein the set of candidate interactions include a first subset of interactions of the first plurality of interactions, and a second subset of interactions of the second plurality of interactions;

conducting, by the processor, priority determinations of the interactions in the set of candidate interactions without conducting priority determinations of remaining interactions of the first and second plurality of interactions not included in the set of candidate interactions, wherein the conducting of the priority determinations include calculating a priority value for each of the interactions in the set of candidate interactions;

selecting, by the processor, an interaction from the set of candidate interactions based on the determined priority values; and routing, by a router coupled to the processor, the selected interaction to an electronic device of the contact center.

11. The method of claim 10, wherein the first and second plurality of interactions are voice interactions, emails, chat messages, or instant messages.

12. The method of claim 10, wherein the first profile is associated with at least one of a first customer segment, a first media type, a first service level, or a first service type, and the second profile is associated with a second customer segment, a second media type, a second service level, or a second service type.

13. The method of claim 10, wherein the condition for conducting priority determinations is detecting a time for conducting the priority determinations.

14. The method of claim 13, wherein the time is based on a rate of conducting the priority determinations, wherein the rate is proportional to a total number of interactions at the contact center.

15. The method of claim 10, wherein the first subset of interactions is a particular number of oldest interactions of the first plurality of interactions, and the second subset of interactions is a particular number of oldest interactions of the second plurality of interactions.

16. The method of claim 15, wherein the particular number of interactions is based on a number of interactions that a pool of agents is predicted to be capable of handling at a time of generating the set of candidate interactions.

17. The method of claim 10, wherein the first subset of interactions is a particular number of oldest interactions of the first plurality of interactions, and the second subset of interactions is a particular number of youngest interactions of the second plurality of interactions.

18. The method of claim 10, wherein the calculating of the priority value for each of the interactions includes calculating the priority value as a function of age and profile associated with each of the interactions, the profile being one of the first and second profiles.

19. A system comprising:

means for identifying a first plurality of interactions and a second plurality of interactions for a contact center;

means for associating the first plurality of interactions with a first profile;

means for associating the second plurality of interactions with a second profile different from the first profile;

means for monitoring for a condition for conducting priority determinations;

generating, by the processor, a set of candidate interactions in response to detecting the condition, wherein the set of candidate interactions include a first subset of interactions of the first plurality of interactions, and a second subset of interactions of the second plurality of interactions;

means for conducting priority determinations of the interactions in the set of candidate interactions without conducting priority determinations of remaining interactions of the first and second plurality of interactions not included in the set of candidate interactions, wherein the means for conducting the priority determinations include means for calculating a priority value for each of the interactions in the set of candidate interactions;

means for selecting an interaction from the set of candidate interactions based on the determined priority values; and means for routing the selected interaction to an electronic device of the contact center.

20. The system of claim 19, wherein the means for calculating the priority value for each of the interactions includes means for calculating the priority value as a function of age and profile associated with each of the interactions, the profile being one of the first and second profiles.

* * * * *